US008163394B2

(12) United States Patent
Lee

(10) Patent No.: US 8,163,394 B2
(45) Date of Patent: Apr. 24, 2012

(54) ALUMINUM FOIL AND METHOD OF MANUFACTURING THE SAME

(76) Inventor: Chun Woo Lee, Kimpo (KR)

( * ) Notice: Subject to any disclaimer, the term of this patent is extended or adjusted under 35 U.S.C. 154(b) by 597 days.

(21) Appl. No.: 12/438,028

(22) PCT Filed: Aug. 21, 2007

(86) PCT No.: PCT/KR2007/004001

§ 371 (c)(1),
(2), (4) Date: Feb. 19, 2009

(87) PCT Pub. No.: WO2008/023924

PCT Pub. Date: Feb. 28, 2008

(65) Prior Publication Data

US 2010/0196725 A1 Aug. 5, 2010

(30) Foreign Application Priority Data

Aug. 23, 2006 (KR) ........................ 10-2006-0079821

(51) Int. Cl.
*B32B 15/04* (2006.01)

(52) U.S. Cl. ........ 428/457; 428/458; 428/459; 428/460; 428/461; 428/462; 428/463; 428/464; 428/465; 428/466

(58) Field of Classification Search ........... 428/457–466
See application file for complete search history.

(56) References Cited

FOREIGN PATENT DOCUMENTS

| | | |
|---|---|---|
| EP | 0368666 | 11/1989 |
| JP | 60008143 | 2/1994 |
| JP | 2542589 | 7/1996 |
| WO | WO 94/05494 | 3/1994 |

*Primary Examiner* — Edward Cain
(74) *Attorney, Agent, or Firm* — IPLA P.A.; James E. Bame

(57) ABSTRACT

Provided is an aluminum foil according to the present invention including: a primer coated layer (13) which is formed by depositing a primer coating liquid on a non-glossy surface of the aluminum foil (11), and drying the primer coating liquid deposited on the non-glossy surface of the aluminum foil at temperature of 20 to 110° C. to then cool the same at temperature of 0 to 20° C.; a mid-coat layer (15) which is formed by depositing the mid-coating liquid on the upper portion of the primer coated layer (13); and a two-coat layer (17) which is formed by depositing the coating liquid on the upper portion of the mid-coat layer (15), and plasticizing the coating liquid deposited on the upper portion of the mid-coat layer for three to five minutes at temperature of 60 to 430° C.

6 Claims, 2 Drawing Sheets

[Fig. 1]
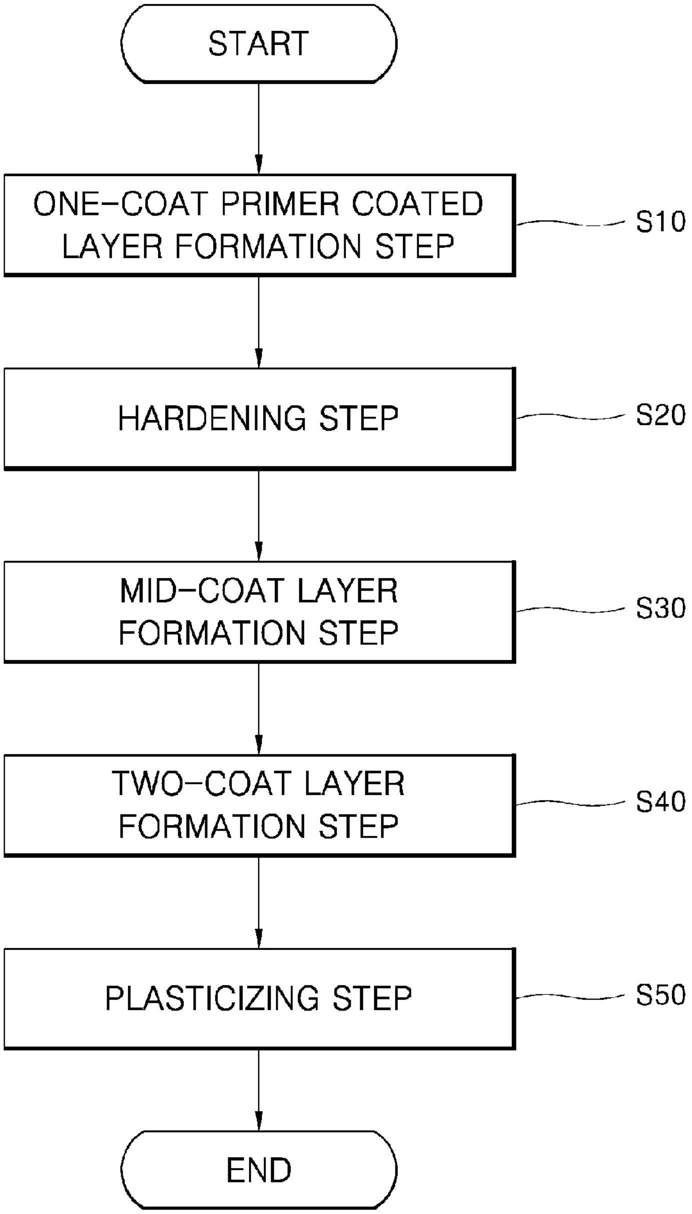
[Fig. 2]
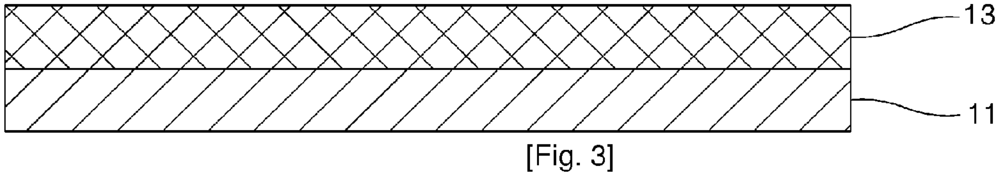
[Fig. 3]
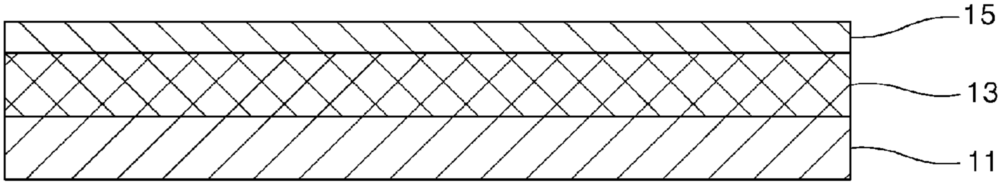

[Fig. 4]
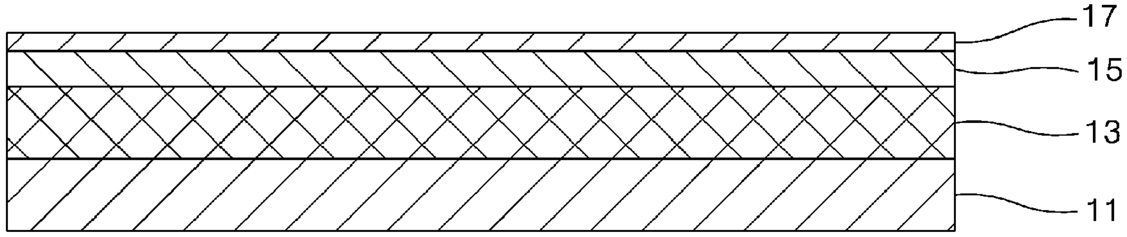

ALUMINUM FOIL AND METHOD OF MANUFACTURING THE SAME

TECHNICAL FIELD

The present invention relates to an aluminum foil and a method of manufacturing the same, and more particularly, to an aluminum foil and a method of manufacturing the same, in which a fluoroplastic coated layer is formed on the aluminum foil to thereby prevent foodstuffs contacting the aluminum foil from sticking to the surface of the aluminum foil in the case of packaging foodstuffs or during cooking.

BACKGROUND ART

Usually, aluminum foils that produced in a foil paper shape are used to wrap foodstuffs such as flesh meat, fish or vegetables or to a cooking heater such as an oven, a meat roast frypan, etc. The aluminum foils are formed into an aluminum plate of 12-20 μm thick by rolling a thick and thin aluminum plate of 300-400 μm four or five-times via a roller. The aluminum plate of 12-20 μm thick is cut out into a predetermined specified dimension and then is used for cooking or wrapping or packaging foodstuffs.

However, since such a conventional aluminum foil whose surface has a smooth shape is of a high heat transfer conductivity and a soft property, heat is delivered directly to the aluminum foil when the aluminum foil is used at the state of being closely attached to the upper surface of the cooking heater and thus foodstuffs are easily burnt and stick to the surface of the aluminum foil when cooking such as frying, roasting, or smoking.

To prevent these phenomena, oil such as cooking oil, butter, margarine or animal fat is applied to the surface of the aluminum foil before cooking. However, a negative impact may be influenced upon health in case of using such oil.

In addition, because the conventional aluminum foil is thin, it may be easily torn. Further, since food sticks to the surface of the aluminum foil, the aluminum foil may be easily torn or damaged and thus may not be re-used after use once.

DISCLOSURE OF INVENTION

Technical Problem

To solve the above problems, it is an object of the present invention to provide an aluminum foil and a method of manufacturing the same, in which a fluoroplastic coated layer is formed on the aluminum foil to thereby prevent foodstuffs contacting the aluminum foil from sticking to the surface of the aluminum foil in the case of packaging foodstuffs or during cooking.

It is another object of the present invention to provide an economical aluminum foil and a method of manufacturing the same, in which a fluoroplastic coated layer is formed on the aluminum foil to thus make the aluminum foil become thick and prevent the aluminum foil from being easily torn, and to thereby prevent foodstuffs contacting the aluminum foil from sticking to the surface of the aluminum foil in the case of packaging foodstuffs or during cooking, with a result that the aluminum foil can be reused several times.

Technical Solution

Accomplish the above object of the present invention, according to an aspect of the present invention, there is provided an aluminum foil having a glossy surface and a non-glossy surface, the aluminum foil comprising:

a primer coated layer which is formed by depositing a primer coating liquid on a non-glossy surface of the aluminum foil, and drying the primer coating liquid deposited on the non-glossy surface of the aluminum foil at temperature of 20 to 110° C. to then cool the same at temperature of 0 to 20° C.;

a mid-coat layer which is formed by depositing the mid-coating liquid on the upper portion of the primer coated layer; and a two-coat layer which is formed by depositing the coating liquid on the upper portion of the mid-coat layer, and plasticizing the coating liquid deposited on the upper portion of the mid-coat layer for three to five minutes at temperature of 60 to 430° C.

According to another aspect of the present invention, there is provided a method of manufacturing an aluminum foil, the aluminum foil manufacturing method comprising:

a one-coat primer coated layer formation step of depositing a primer coating liquid on the surface of the aluminum foil, in order to form a one-coat primer coated layer;

a hardening step of hardening the primer coated layer by cooling the aluminum foil on which the primer coated layer has been formed at 0 to 20° C. after having dried the aluminum foil on which the primer coated layer has been formed at 20 to 110° C.;

a mid-coat layer formation step of depositing a mid-coating liquid on the upper portion of the primer coated layer, in order to form a mid-coat layer;

a two-coat layer formation step of depositing a two-coat liquid on the upper portion of the mid-coat layer, in order to form a two-coat layer sequentially; and a plasticizing step of plasticizing the aluminum foil on which the mid-coat layer and the two-coat layer have been sequentially formed at 60 to 430° C. for three to five minutes, in order to harden the mid-coat layer and the two-coat layer.

Preferably but not necessarily, the mid-coating liquid comprises a mixture of fluoroplastic dispersion liquid, pigment, pearl, a surface active agent and distilled water, and the two-coat coating liquid comprises a mixture of fluoroplastic dispersion liquid, pearl, a surface active agent and distilled water.

Advantageous Effects

As described above, the present invention provides an aluminum foil and a method of manufacturing the same, in which a fluoroplastic coated layer is formed on the aluminum foil to thereby prevent foodstuffs contacting the aluminum foil from sticking to the surface of the aluminum foil in the case of packaging foodstuffs or during cooking. In addition, the present invention provides an economical aluminum foil and a method of manufacturing the same, in which a fluoroplastic coated layer is formed on the aluminum foil to thus make the aluminum foil become thick and prevent the aluminum foil from being easily torn, and to thereby prevent foodstuffs contacting the aluminum foil from sticking to the surface of the aluminum foil in the case of packaging foodstuffs or during cooking, with a result that the aluminum foil can be reused several times.

BRIEF DESCRIPTION OF THE DRAWINGS

The above and/or other objects and/or advantages of the present invention will become more apparent by describing the preferred embodiments thereof in detail with reference to the accompanying drawings in which:

FIG. 1 is a flowchart view for illustrating a method of manufacturing an aluminum foil according to the present invention; and FIGS. 2 to 4 are cross-sectional view for an aluminum foil manufacturing method according to the present invention.

BEST MODE FOR CARRYING OUT THE INVENTION

Hereinbelow, an aluminum foil and a method of manufacturing the same according to a preferred embodiment of the present invention will be described with reference to the accompanying drawings. Like reference numerals denote like elements through the following embodiments.

As illustrated in FIGS. 1 to 4, an aluminum foil according to the present invention includes: a primer coated layer 13 which is formed by depositing a primer coating liquid on a non-glossy surface of the aluminum foil 11, and drying the primer coating liquid deposited on the non-glossy surface of the aluminum foil at temperature of 20 to 110° C. to then cool the same at temperature of 0 to 20° C.; a mid-coat layer 15 which is formed by depositing the mid-coating liquid on the upper portion of the primer coated layer 13; and a two-coat layer 17 which is formed by depositing the coating liquid on the upper portion of the mid-coat layer 15, and plasticizing the coating liquid deposited on the upper portion of the mid-coat layer for three to five minutes at temperature of 60 to 430° C.

In addition, a method of manufacturing an aluminum foil, the aluminum foil manufacturing method includes: a one-coat primer coated layer formation step (S10) of depositing a primer coating liquid on the surface of the aluminum foil 11, in order to form a one-coat primer coated layer 13; a hardening step (S20) of hardening the primer coated layer 13 by cooling the aluminum foil 11 on which the primer coated layer has been formed at 0 to 20° C. after having dried the aluminum foil on which the primer coated layer has been formed at 20 to 110° C.; a mid-coat layer formation step (S30) of depositing a mid-coating liquid on the upper portion of the primer coated layer 13, in order to form a mid-coat layer 15; a two-coat layer formation step (S40) of depositing a two-coat liquid on the upper portion of the mid-coat layer 15, in order to form a two-coat layer 17 sequentially; and a plasticizing step (S50) of plasticizing the aluminum foil 11 on which the mid-coat layer 15 and the two-coat layer 17 have been sequentially formed at 60 to 430° C. for three to five minutes, in order to harden the mid-coat layer 15 and the two-coat layer 17.

The mid-coating liquid includes a mixture of fluoroplastic dispersion liquid, pigment, pearl, a surface active agent and distilled water, and the two-coat coating liquid comprises a mixture of fluoroplastic dispersion liquid, pearl, a surface active agent and distilled water.

As illustrated in FIGS. 1 and 2, a primer coating liquid is deposited on the surface of the aluminum foil 11, using a sprayer, in order to form a one-coat primer coated layer 13 of approximately 20-40 μm, at a one-coat primer coated layer formation step (S10). Here, the primer coating liquid formed of fluoroplastic dispersion liquid as a main ingredient is well combined with an aluminum foil 11.

The aluminum foil 11 has a glossy surface and a non-glossy surface. It is preferable that the primer coating liquid 13 is formed on the non-glossy surface of the aluminum foil 11, so that the primer coating liquid 13 is well combined with the aluminum foil 11.

At a hardening step (S20), the aluminum foil 11 on which the primer coated layer 13 has been formed is dried at 20 to 110° C., and then the aluminum foil 11 on which the primer coated layer 13 has been formed is cooled at 0 to 20° C., to thus harden the primer coated layer 13. Since the primer coated layer 13 is dried and then cooled at normal temperature at the hardening step (S20), coherence between the primer coated layer 13 and the mid-coat layer 15 increases at a mid-coat layer formation step S30 which is a post-process of the hardening step (S20). Accordingly, the mid-coat layer 15 can be coated well on the upper portion of the primer coated layer 13.

As illustrated in FIG. 3, at a mid-coat layer formation step (S30), a mid-coating liquid is deposited on the upper portion of the primer coated layer 13, in order to form a mid-coat layer 15 of approximately 5-15 μm thick. Here, the dry mid-coat layer 15 is not dried after having formed the mid-coat layer 15. The reason is because the mid-coat layer 15 is not combined well with the two-coat layer 17 at a two-coat layer formation step (S40) which is a post-process of the mid-coat layer formation step (S30) if the mid-coat layer 15 has been dried in the mid-coat layer formation step (S30). In this case, the two-coat layer 17 may separatedly secede from the mid-coat layer 15. It is preferable that the mid-coat layer 15 is formed using a coating liquid consisting of a composition ratio of fluoroplastic dispersion liquid of 85 weight %, pigment of 4 weight %, pearl of 1.5 weight %, a surface active agent of 0.8 weight %, and distilled water of 8.7 weight %.

As illustrated in FIG. 4, at a two-coat layer formation step (S40), a two-coat liquid is deposited with a thickness of approximately 5 μm or below on the upper portion of the mid-coat layer 15, using a spray, in order to form a two-coat layer 17 sequentially, before the mid-coat layer 15 has been dehydrated or dried. As illustrated in FIG. 4, at a plasticizing step (S50), the aluminum foil 11 on which the mid-coat layer 15 and the two-coat layer 17 have been sequentially formed is plasticized at 60 to 430° C. for three to five minutes, in order to harden the mid-coat layer 15 and the two-coat layer 17.

It is preferable that the two-coat layer 17 is formed using a coating liquid consisting of a composition ratio of fluoroplastic dispersion liquid of 90 weight %, pearl of 2.5 weight %, a surface active agent of 0.8 weight %, and distilled water of 6.7 weight %.

The mid-coat layer 15 is mixed with pigment and thus become opaque. Accordingly, the two-coat layer 17 is formed on the upper surface of the mid-coat layer 15, to thus form a beautiful coated layer which is lustrous.

Thus, in the case of an aluminum foil and a method of manufacturing the same according to the present invention, a fluoroplastic coated layer is formed on the surface of the aluminum foil 11 in which the one-coat primer coated layer 13, the mid-coat layer 15, and the two-coat layer 17 are sequentially formed. Accordingly, foodstuffs contacting the aluminum foil 11 is prevented from sticking to the surface of the aluminum foil 11 in the case of packaging foodstuffs or during cooking. As a result, oil need not be used during cooking foodstuffs. Further, foodstuffs may not be prevented from being easily burnt by the fluoroplastic coated layer, during cooking such as frying, roasting, and smoking.

Meanwhile, in the case of the conventional art, once an aluminum foil is used during cooking, foodstuffs may stick to the aluminum foil.

Accordingly, the aluminum foil may be easily torn or damaged. As a result, it is not possible to re-use an aluminum foil once the aluminum foil has been used. However, in the case of the present invention, a fluoroplastic coated layer formed on the aluminum foil is not burnt even at 450° C. to 500° C.

Further, it is difficult for foodstuffs to stick to the surface of the fluoroplastic coated layer formed on the aluminum foil. Still further, the aluminum foil according to the present invention is made to become thicker than the conventional aluminum foil to thus prevent the aluminum foil from being easily torn. The aluminum foil according to the present invention can be continuously re-used unless the fluoroplastic coated layer is removed from the surface of the aluminum foil, to accordingly provide users with an economical benefit. Further, in the case that an aluminum foil according to the present invention is used in a cooking heater, there is no need to wash or clean the cooking heater since the cooking heater does not become dirty or polluted by the leftovers of foodstuffs. Accordingly, detergents need not be used to thereby be contributed for preventing water pollution.

Meanwhile, although the aluminum foil according to the present invention is a thin silver-foil product, it is used in a close contact with the upper surface of a cooking heater such as a general frying pan, pan, pizza pan, and Bulgogi plate in which Bulgogi is one of the Korean traditional food that seasoned or non-seasoned meat or pork is roasted or fried. In addition, the aluminum foil according to the present invention may be laid on the surface of a third nonflammable material such as steel iron, stainless steel, aluminum, copper, ceramic stone or glass in addition to the cooking heater, and then foodstuffs which are put on the surface of the third nonflammable material may be conveniently cooked. Further, the aluminum foil according to the present invention may wrap foodstuffs to thus enable a user to conveniently cook the wrapped foodstuffs.

MODE FOR THE INVENTION

As described above, the present invention has been described with respect to a particularly preferred embodiment. However, the present invention is not limited to the above embodiment, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides an aluminum foil and a method of manufacturing the same, in which a fluoroplastic coated layer is formed on the aluminum foil to thereby prevent foodstuffs contacting the aluminum foil from sticking to the surface of the aluminum foil in the case of packaging foodstuffs or during cooking.

The invention claimed is:

1. An aluminum foil having a glossy surface and a non-glossy surface, the aluminum foil comprising:

a primer coated layer which is formed by depositing a primer coating liquid on a non-glossy surface of the aluminum foil, and drying the primer coating liquid deposited on the non-glossy surface of the aluminum foil at temperature of 20 to 110° C. to then cool the same at temperature of 0 to 20° C.;

a mid-coat layer which is formed by depositing the mid-coating liquid on the upper portion of the primer coated layer; and a two-coat layer which is formed by depositing the coating liquid on the upper portion of the mid-coat layer, and plasticizing the coating liquid deposited on the upper portion of the mid-coat layer for three to five minutes at temperature of 60 to 430° C., wherein the mid-coating liquid comprises a mixture of fluoroplastic dispersion liquid, pigment, pearl, a surface active agent and distilled water.

2. The aluminum foil according to claim 1, wherein the two-coat coating liquid comprises a mixture of fluoroplastic dispersion liquid, pearl, a surface active agent and distilled water.

3. A method of manufacturing an aluminum foil, the aluminum foil manufacturing method comprising:

a one-coat primer coated layer formation step of depositing a primer coating liquid on the surface of the aluminum foil, in order to form a one-coat primer coated layer;

a hardening step of hardening the primer coated layer by cooling the aluminum foil on which the primer coated layer has been formed at 0 to 20° C. after having dried the aluminum foil on which the primer coated layer has been formed at 20 to 110° C.;

a mid-coat layer formation step of depositing a mid-coating liquid on the upper portion of the primer coated layer, in order to form a mid-coat layer;

a two-coat layer formation step of depositing a two-coat liquid on the upper portion of the mid-coat layer, in order to form a two-coat layer sequentially; and a plasticizing step of plasticizing the aluminum foil on which the mid-coat layer and the two-coat layer have been sequentially formed at 60 to 430° C. for three to five minutes, in order to harden the mid-coat layer and the two-coat layer.

4. The aluminum foil manufacturing method of claim 3, wherein the mid-coating liquid comprises a mixture of fluoroplastic dispersion liquid, pigment, pearl, a surface active agent and distilled water.

5. The aluminum foil manufacturing method of claim 3, wherein the two-coat coating liquid comprises a mixture of fluoroplastic dispersion liquid, pearl, a surface active agent and distilled water.

6. The aluminum foil manufacturing method of claim 3, wherein the primer coating liquid is formed on the non-glossy surface of the aluminum foil, at the one-coat primer coated layer formation step.

* * * * *